US012764348B2

(12) United States Patent
Waller et al.

(10) Patent No.: US 12,764,348 B2
(45) Date of Patent: Oct. 13, 2026

(54) DYNAMIC CONTENT DELIVERY PRIORITIZATION

(71) Applicant: ARRIS Enterprises LLC, Suwanee, GA (US)

(72) Inventors: Brian D. Waller, Hillsborough, NJ (US); Brajesh Arora, Cupertino, CA (US); Anurag Arora, Bengaluru (IN)

(73) Assignee: ARRIS Enterprises LLC, Horsham, PA (US)

( * ) Notice: Subject to any disclaimer, the term of this patent is extended or adjusted under 35 U.S.C. 154(b) by 0 days.

(21) Appl. No.: 18/371,350

(22) Filed: Sep. 21, 2023

(65) Prior Publication Data

US 2024/0129559 A1 Apr. 18, 2024

Related U.S. Application Data

(60) Provisional application No. 63/408,792, filed on Sep. 21, 2022.

(51) Int. Cl.
*H04N 21/231* (2011.01)

(52) U.S. Cl.
CPC ................................ *H04N 21/231* (2013.01)

(58) Field of Classification Search
None
See application file for complete search history.

(56) References Cited

U.S. PATENT DOCUMENTS 8,533,767 B1 * 9/2013 Tsang ................ H04N 21/8133 725/143
2022/0239968 A1 * 7/2022 Waller ................ H04N 21/251

* cited by examiner

*Primary Examiner* — Omar S Parra
(74) *Attorney, Agent, or Firm* — Chernoff, Vilhauer, McClung & Stenzel, LLP

(57) ABSTRACT

Devices, systems, and methods for selectively reordering a plurality of content titles in a queue storing content titles to be delivered to a Video-on-Demand (VOD) server accessible to customers over a content delivery network, and delivered by an availability window start time, by using an estimated time to such delivery.

19 Claims, 8 Drawing Sheets

| PACKAGE TITLE | COMPLETE PRIOR TO LICENCE WINDOW | HOW LATE AFTER START WINDOW |
|---|---|---|
| TITLE A | YES | |
| TITLE B | YES | |
| TITLE C | NO | 5 HOURS LATE |
| TITLE D | NO | 2 DAYS LATE |
| TITLE E | NO | 3 MINUTES LATE |

*FIG. 6*

Fig. A: Content Prioritization In Order Received

On Time Arrival Metric = 25%. 1 Out Of 4 Titles Will Reach Storefront Before Deadline.

Fig. B: Content Prioritization Using License Start Date

On Time Arrival Metric = 50%.

Fig. C: After Dynamic Delivery Prioritization

On Time Arrival Metric = 100%.

DYNAMIC CONTENT DELIVERY PRIORITIZATION

CROSS-REFERENCE TO RELATED APPLICATIONS

The present application claims priority to U.S. Provisional App. No. 63/408,792 filed Sep. 21, 2022, the contents of which are incorporated herein by reference in their entirety.

BACKGROUND OF THE INVENTION

Referring to FIG. 1, a traditional cable television production and distribution system is illustrated. A content provider 100 provides a cable TV distributor 110 with video programming for the cable TV distributor to distribute to customers 120 through a cable network 130. The content provider 100 may be the party responsible for creating and/or producing one or more videos or it may be the party who distributes such one or more videos.

The content provider 100 typically provides the video programming to the cable TV distributor 110 via a satellite link 110 and/or a high-speed broadband network system, such as, for example, the Internet. In other cases, the content provider provides the video programming to the cable TV distributor on a recording media (e.g., digital video disc, hard drive). The cable TV distributor 110 provides the customers 120 with video programming via the cable network 130. The cable network 130 may be composed of, for example, coaxial and/or fiber-optic cabling. Video programming is distributed to customers in either an analog or digital (MPEG) format via the cable network 130. The video programming is received by a consumer premise device associated with the customer 120 that is capable of receiving the analog or the digital signal and displaying video programming represented by the signal(s) on an associated display device. The customer premise equipment may be, for example, a television, a set top box, or otherwise. The typical cable TV distributor 110 includes media storage server for storing programming content received from the content provider 100 for a predetermined time, typically until it is distributed to customers via the cable network 130. Referring also to FIG. 2, the media storage server 200 may be for example, one or more hard-disk drive-based storage servers on which the video programming may be recorded.

Referring to FIG. 3, a customer device 300 is often capable of bi-directional communication with a head end of the cable TV distributor 110 via the cable network 130 or via other networks. Aside from converting the video programming signal received from the cable TV distributor 110 into a signal that can be displayed on an associated display device 310, the customer device 300 also provides a customer 120 with the ability to provide input to, for example, to control the selection of video programming available from the cable TV distributor 110 via one or more channels over which the cable TV distributor will distribute video programming for display/viewing by a customer 120.

Many customer devices associated with a cable network are configured to generate and/or display a programming guide from which to select video content. Some programming guides are generally referred to an electronic programming guide in the form of a grid pattern of times and channels, such as what is traditionally provided with cable television.

In other embodiments, customers with an Internet connection may access video content that is provided by the cable television distributor 110 or other video content delivery services directly through an Internet based content delivery video service, such as for example, www.hulu.com, www.abc.com, www.netflix.com, and www.historychannel-.com. In this case, typically the video content delivery service organizes the content in some manner, such as using a graphical interface. The video content is selectable by the customer to be viewed, normally on-demand.

The foregoing and other objectives, features, and advantages of the invention may be more readily understood upon consideration of the following detailed description of the invention, taken in conjunction with the accompanying drawings.

BRIEF DESCRIPTION OF THE SEVERAL VIEWS OF THE DRAWINGS

FIG. 6 shows a user interface of the video content management system.

DETAILED DESCRIPTION OF PREFERRED EMBODIMENT

Figure 1:
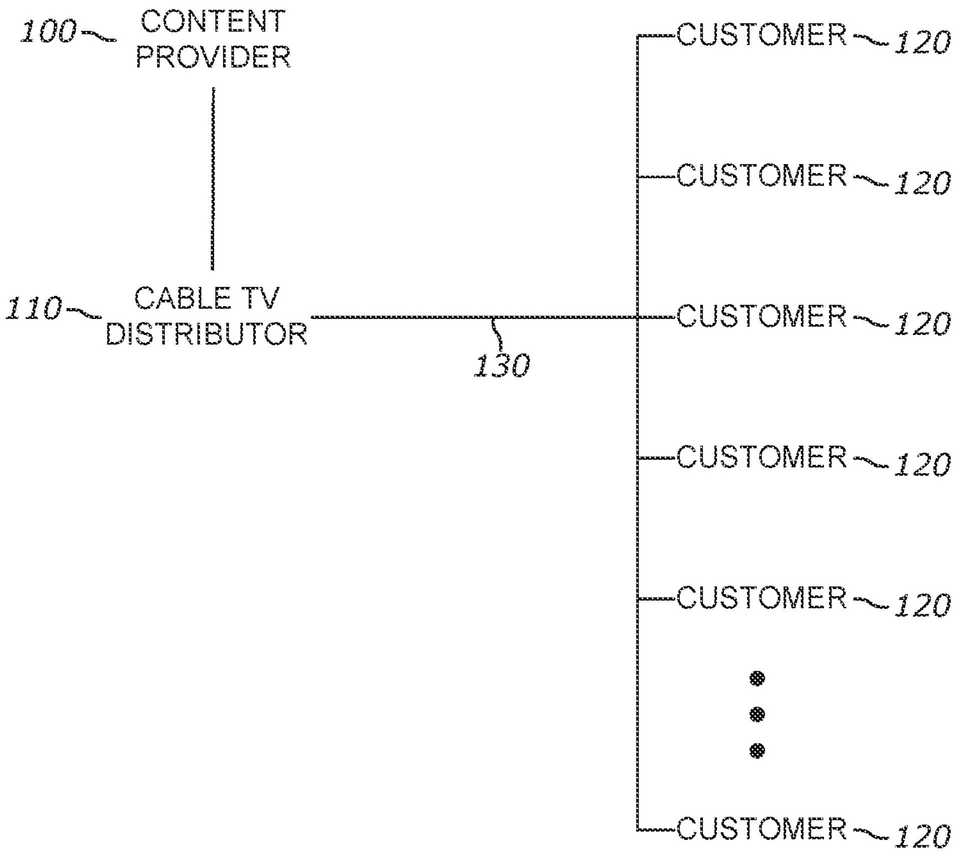
FIG. 1 shows a cable distribution system for video content.
Figure 2:
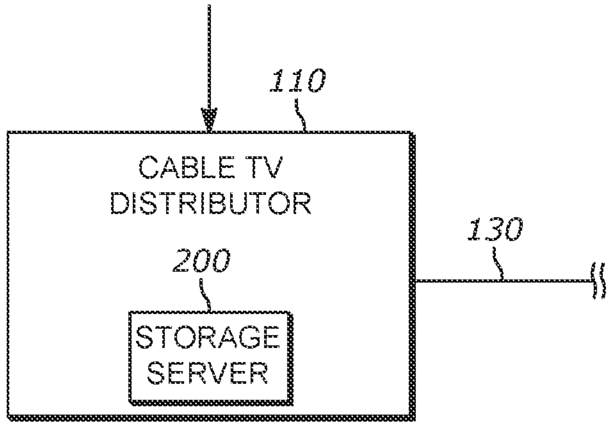
FIG. 2 shows a cable television distributor for video content.
Figure 3:
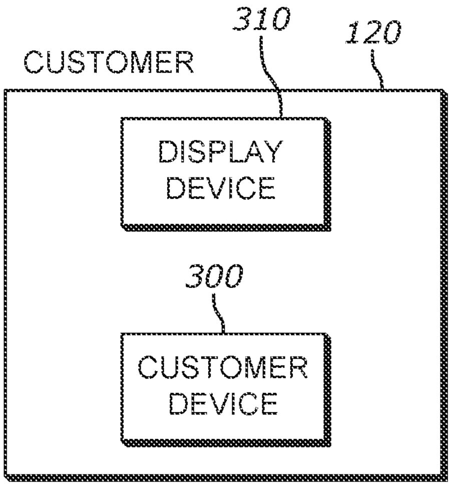
FIG. 3 shows a customer of video content.
Figure 4:
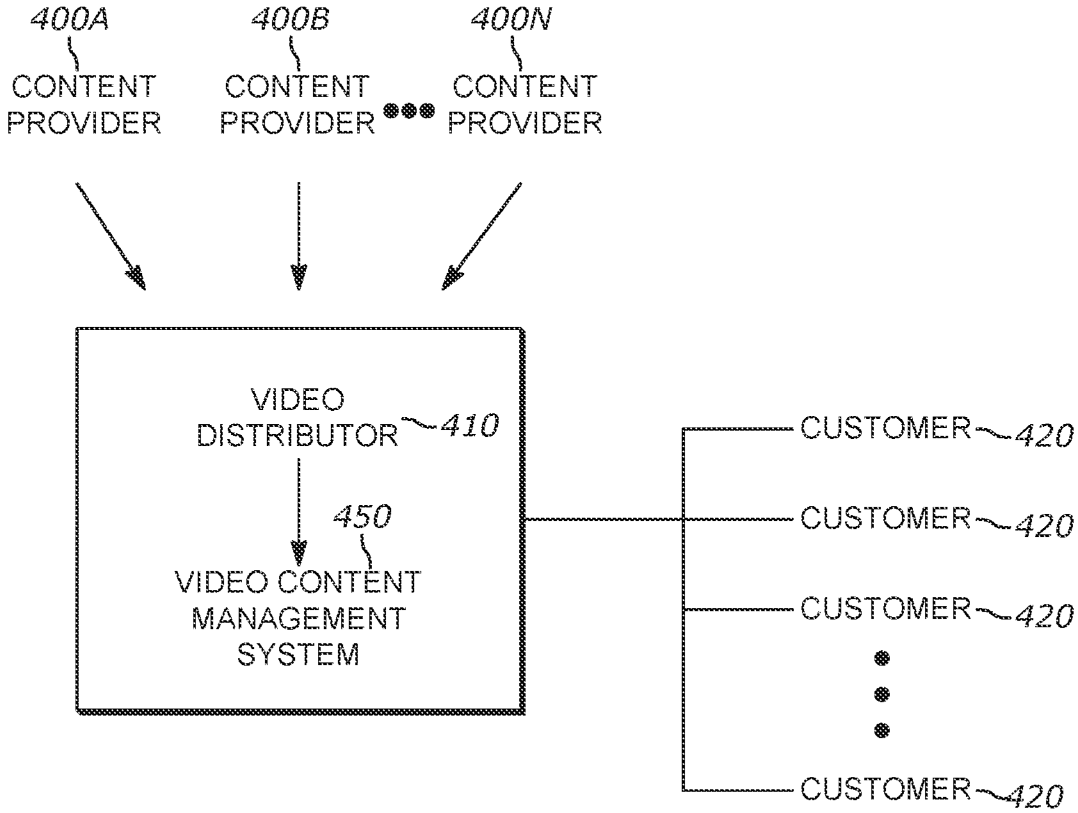
FIG. 4 shows a video distribution system with a video content management system.

Referring to FIG. 4, in many cases, there are multiple content providers 400A, 400B, . . . 400N, all of which are providing video content to a video distributor 410. The video content may be provided in any suitable manner, such as across a network or by a physical medium. The video distributor 410 then provides the video content on demand or to a server, referred to as a storefront, which in turn provides the video content on demand, to one or more customers 420, such as through the Internet or a cable network. Each of the content providers 400 provides video content to the video distributor 410 which is received by a video content management system 450. The video content may be provided in the form of a package, where the package includes a video file inclusive of an audio file embedded therein (or a separate audio file if the audio file is not embedded in the video file), and/or a metadata file that describes characteristics of the video file and its intended subsequent processing so that the video file is suitable for the intended customers 420. The processed video content is then made available to the storefront, e.g., as a video on demand service, for the intended customers 420. In some cases, the video on demand service is a transactional video on demand system and in other cases the video on demand service is a subscription video on demand system. The transactional video on demand system may take additional time for processing so that the transactional portion to purchase the rights to view the video content can be created.

The content providers, or other rights holder, grant rights to a particular storefront, such as a video on demand service, to provide the video content to particular customers for a limited period of time or availability window. The availability window may have a start date and/or start time (inherent from the time the content is provided if no start date or start time is provided) and the availability window may have an end date and/or end time (perpetual if no end date or end time is provided). The content providers typically provide the video content in a master file format (e.g., ingest file format provided by the content provider), which is then processed by the video content management system 450 into a format suitable for the storefront which may include a plurality of different video files, each of which have different characteristics. The content providers make their content available to the video content management system 450 with different lead times before the start date and time of the availability window. For example, some content may be provided to the video content management system 450 several days or several weeks prior to the respective start time of the availability window. In cases with sufficient lead time, there is normally available time for the video content management system 450 to process the video content and make it available to the storefront in a timely manner. For example, some content may be provided to the video content management system 450 a few hours or a few minutes prior to the respective start date and time of the availability window. In cases with a limited amount of lead time, there is unlikely available time for the video content management system 450 to process the video content and make it available to the storefront before the start time of the availability window. As a result, the storefront may miss out on revenue, and the customers may get frustrated with that storefront and seek an alternative storefront from which to obtain the desired video content. Also, the date and time at which the video content is provided to the video content management system 450 is generally unpredictable and the date and time at which different content providers provide video content to the video content management system 450 is likewise unpredictable. Further, the amount of content provided by any particular content provider at any particular date and time is likewise unpredictable, from a single video file and/or metadata file to thousands of video files and/or metadata files. To further complicate matters, the content providers often provide updated metadata which identifies the manner of distribution of the video content and the manner of presentation of the video content in the storefront. To also further complicate matters, the content providers often provide updated video content without updated metadata content which requires reprocessing of the video content. To even further complicate matters, the content providers often provide new video content with new metadata which identifies the manner of processing the video content, the distribution of the video content, and the manner of presentation of the video content in the storefront. Having video content being made available on a storefront on a timely basis, coinciding with the start date and time of the availability window, is important to the content providers and/or the storefront providers, to maximize the duration of the content being available which is especially desirable when the content is being paid for on an individual basis by customers.

Figure 5:
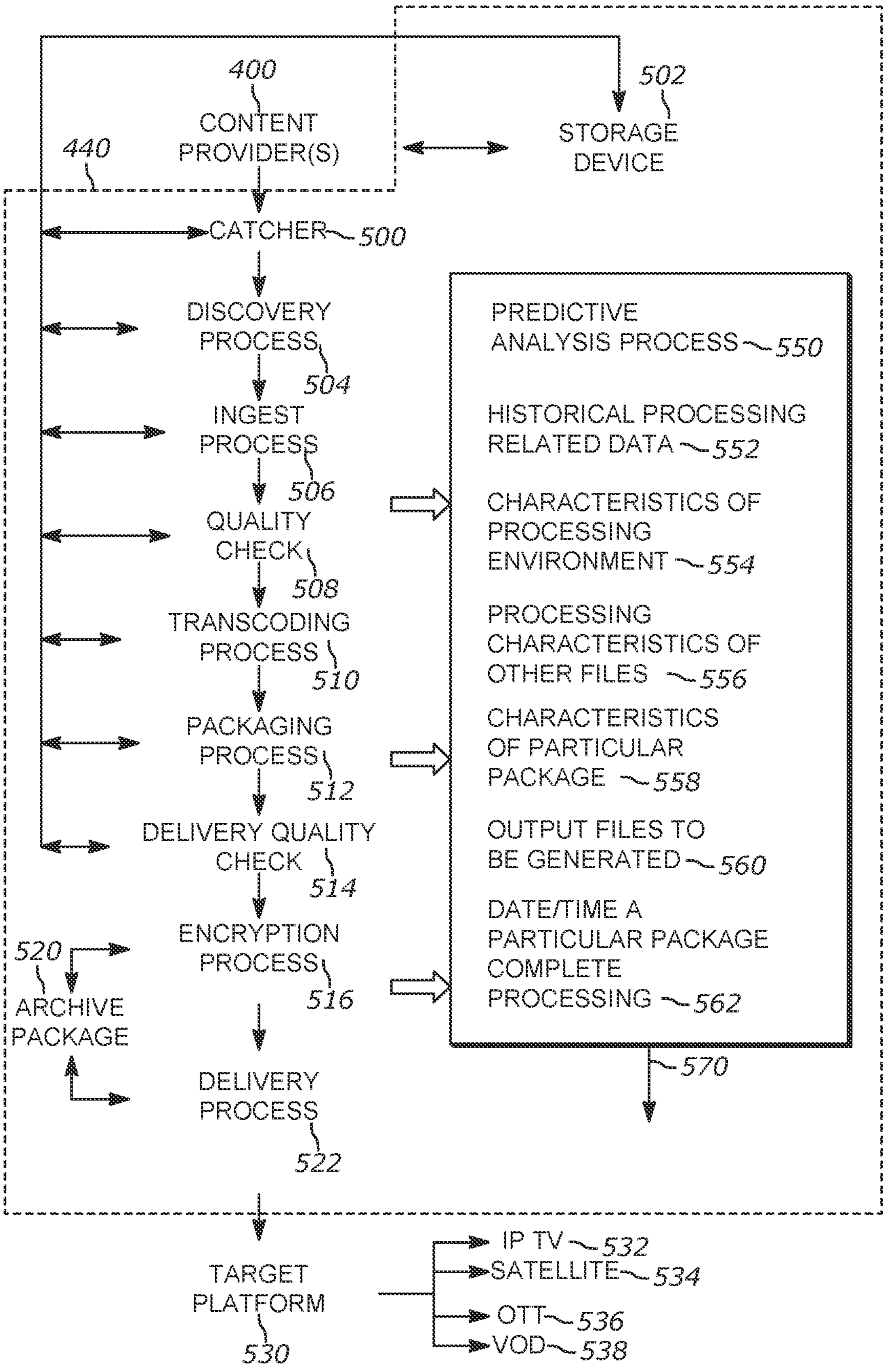
FIG. 5 shows a video content management system.

Referring to FIG. 5, the content provider(s) 400 provide the video files and/or the metadata files, often in the format of a package, to the video content management system 450. A catcher 500 receives the packages from the content provider(s) 400, and may store the packages on a storage device 502, such as a hard drive based file server, until they are processed by the video content management system 450. Each of the packages is provided to a discovery process 504, that analyzes each package to characterize the video file, such as a video file duration, a video file format, an audio format, a video file bitrate, etc. Each of the packages is also provided to the discovery process 504, that analyzes each package to characterize the metadata file, such as a video file duration, a video file format, an audio format, a video file bitrate, a transcoder to transcode the video file and/or audio file, an input video resolution, an output video resolution, an input video interlaced/progressive, an output video interlaced/progressive, an output video file duration, an output video file format, an output audio format, an output video file bitrate, encryption process if any, multiple different of the above from a single video file suitable for providing the content over varied networks and/or to varied devices each having different video file characteristics. Also, the transcoding process or other process may include time to stitch in a video disclaimer (e.g., rating advisory), as indicated by the metadata file. Also, the discovery process 504 may characterize the metadata file to determine characteristics related to the storefront, such as a genre (e.g., animation, movies, Korean, documentary, comedy, drama, children), a location in the storefront, a poster associated with the video content, a storefront, a start time, a start date, an end date, an end time, among other characteristics related to how the video content is presented to the customer through the storefront. In this manner, the discovery process 504 may be used to characterize the subsequent processing to be performed by the video content management system 450, including modifications to the storefront for the video content.

After the discovery process 504, the package is ingested by an ingest process 506. The ingest process separates each of the video files and/or metadata files from the respective package files for subsequent processing in an orderly manner. In this manner, each of the package files from the storage device 502 may be ingested in a manner consistent with the processing capabilities of the system to process the contents of the package files.

After the ingest process 506 for a package, it is desirable to perform a quality check 508 on the video file to ensure that it is suitable for subsequent processing, such as there are not errors in the video file. It is also desirable to perform the quality check 508 on the metadata file to ensure that its contents do not contain errors. In the event that an error is determined, the package may be flagged as containing an error together with a description of the error, so that the package may be repaired and provided again to the video content management system 450 for subsequent processing. In this manner, package files that include errors are not subsequently processed, thereby consuming computational resources when the resulting processing is going to ultimately result in errors.

After the quality check 508 of the contents of the package, the video file may optionally go through a transcoding process 510. The transcoding process 510 is a digital-to-digital conversion from one encoding to another encoding, such as the video file and/or audio file from an input format to one or more output formats. By way of example, the input format may be an AVI file format and the output may be a HEVC file format. By way of example, the input format may include high-definition progressive file format and the output may be standard-definition interlaced file format. By way of example, the input format may have a first bit rate and the output may have a different second bit rate. By way of example, the input format may have MP3 audio and the output format may have WAV audio. The transcoding process 510 may use a particular transcoder defined by the metadata or the content provider. In other cases, the transcoding process 510 may use any available transcoder, as desired.

After the transcoding process 510, a packaging process 512 may be performed which gathers together the one or more video files, together with the one or more metadata files, into one or more packages for the respective video content.

After the packing process 512, a delivery quality check process 514 is performed on the packages, the one or more video files, and the one or more metadata files, to ensure that it is suitable for subsequent use by the storefront, such that there are not errors. In the event that an error is determined, the package may be flagged as containing an error together with a description of the error, so that the package may be repaired and provided again to the video content management system 450 for subsequent processing. In this manner, package files that include errors are not subsequently processed, thereby consuming computational resources or providing packages unsuitable for use by the storefront.

After the delivery quality check 514, an optional encryption process 516 may be performed on each of the packages, video file(s), and/or metadata file(s).

After the encryption process 516, the video content management system 450 may archive the resulting package 520 of the ingested content, or otherwise deliver the resulting package 522 or an archived package 520 of the ingested content.

The video content management system 450 may store and retrieve the resulting files and processing on the storage device 502 at any point in the process, as desired.

The packages are delivered 522 to a target platform and/or storefront 530. The target platform and/or storefront, may include one or more ways in which the content is provided to the customer, such as on demand. For example, the target platform and/or storefront 530, may include Internet Protocol television 532, satellite 534, over the top service 536, video on demand 538, etc.

In some cases, such as for HTTP Live Streaming a series of different files are created, each for a different bitrate and/or image size, and the different files a chunked. Also, a series of different manifest files are likewise created.

Each of the services of the video content management system 450 may include a queue of one or more files to be processed, a start time and date at which each of the files have started processing, and an end time and date at which each of the files have completed processing. Each of the services of the video content management system 450 may process the files in a serial and/or parallel fashion, depending on processing capabilities of the particular service. For example, there may only be a single hardware-based transcoder for selected files and other processes that need to be processed in a serial fashion. For example, there may be multiple threads and/or processors available for the discovery process and other processes for parallel processing.

Unfortunately, with all the various processes used to process packages for particular target platforms, it is difficult to ensure that the packages are processed in a timely manner, especially in a timely manner relative to an availability window which may be from minutes to hours to days from the time the packages are received. As a result, it is desirable to estimate processing characteristics of each of the processes for a particular type of video file and/or metadata content within the processing pipeline to estimate how long each of the processes will take based upon the current processing characteristics for the particular process. This estimation may likewise take into account whether some processes are serial in nature for each file, or whether some processes are parallel in nature for multiple files. This estimation may further take into account the current processing capabilities of the system, such as the number of processors currently available for such processing for each of the processes. Accordingly, it is desirable to be able to estimate the time for each file to be processed by each process of the processing pipeline based upon characteristics of the current file, characteristics of other files to be processed or being processed, and characteristics of the processing environment.

A predictive analysis process 550, referred to herein as a Predictive Content Processing Estimator (PCPE), may be used that combines historical processing related data 552 for one or more of the processes of the video content management system 450, characteristics of the processing environment 554, processing characteristics of other files 556 currently in or scheduled to be in the processing pipeline, together with characteristics of a particular package 558 (including video file(s) and/or metadata file(s)) in light of the output package(s) to be generated 560 (including video file(s) and/or metadata file(s)) to provide an estimation of the date and/or time that a particular package will complete its processing 562. The predictive analysis process 550 may output an estimated date/time 570 for each package to complete processing for each process of the processing pipeline and for its completion of the processing pipeline.

The historical processing related data may be based upon training data and/or previously processed packages, as desired. The input from the processing pipeline may include event data, such as the start time/date that each file starts processing by a particular process and the end time/date that each file ends processing by a particular process, so that the predictive analysis process 550 may update its estimate that a particular file will complete its processing for the processing pipeline.

The prediction may use a machine learning process, if desired, such as a Random Forest Algorithm. The Random Forest Algorithm is based upon an ensemble technique, where it analyzes and learns data by constructing multiple decision trees of input data, by row sampling (e.g., sampling rows from the training data), and feature sampling (e.g., sampling on a subset of key parameters). Based on the decision trees that are used for the input, the Random Forest Algorithm may be used to estimate a prediction that fits a majority of the training data. Other machine learning techniques may likewise be used, as desired.

Referring to FIG. 6, based upon the estimated date/time(s) 570 from the predictive analysis process 500 for each package to complete processing for each process of the processing pipeline and for its completion of the processing pipeline a graphical user interface may be presented to the operator and/or content provider that indicates whether the particular package will complete its processing prior to the start of the availability window or otherwise its processing will not be completed until after the start of the availability window, how late after the start of the availability window, and time to complete. For example, the packages being processed may be displayed together with an indication whether each of the packages will complete their respectively procession before or after the start of the availability window. For example, the packages being processed may be displayed together with an indication how long after the availability window starts will a particular package be completed. Also, e-mail or other communications may be provided to the operator and/or content provider to indicate the timelines of the completion of particular packages. Based upon the predictive analysis process 500, the operator and/or content provider may reprioritize their content to attempt to complete its processing prior to the availability window. Also, a variable threshold may be used to indicate an alert, such as completed processing at least 1 hour before the start of the availability window. Also, a color indication may be used, such as green for complete prior to the start of the availability window and red for complete after the start of the availability window.

As described earlier, a Video Content Management System (VCMS) receives Content Assets (consisting of metadata and associated content) from Content Providers, encodes it and publishes it to one or more Video-on-Demand (VOD) storefront(s). A VOD Service Provider's goal is to keep content refreshed continuously on the Storefront, for an engaging viewing experience.

As also described earlier. VOD storefronts are only able to offer content based on an availability window (e.g., Jan. 1, 2020 at midnight to Dec. 31, 2020 at midnight. Content providers make their content available to storefronts with different lead times relative to the availability window. For example, some content may be provided to the VOD Service Provider days or weeks prior to its availability window, while in other instances it may be provided with only hours of lead time. Content providers therefore make their content available to a VOD service provider on individualized and sometimes unpredictable schedules. Sometimes a content provider provides hundreds or thousands of new content titles, updated content, or updated metadata in a short period of time. Thus, on-time availability of content on the storefront is a performance indicator for VOD Service Providers.

A VOD service provider therefore strives to ensure that all its content makes it to the storefront in time for the content's availability window i.e., the start time of that availability window. However, with content coming into the system at unpredictable times and competing for finite resources, a static priority is not sufficient to ensure the most efficient use of processing and other resources, and by using a static priority, a VCMS may miss the start date needlessly by processing content that could have been deferred. Content that does not make it to the storefront by the start time of the availability window results in lost revenue for the service provider, as customers may become discouraged and rent/buy that content from another provider—or worse, be discouraged and leave that service Provider altogether.

Disclosed is a novel Dynamic Content Delivery Prioritization (DCDP) system that addresses this problem. DCDP uses the remaining time required to deliver content to the storefront to make optimized decisions on prioritization, accomplishing this by leveraging the PCPE, described earlier in this specification, which uses historical data and current system conditions to estimate a content's remaining delivery time to the storefront. As noted previously in this specification, the PCPE in some embodiments may use a machine learning algorithm along with current system conditions to predict the remaining time to delivery.

Specifically, the DCDP disclosed herein considers current system conditions and determines if content will arrive late to the storefront by comparing the estimated remaining delivery time against the availability window start time. If content will arrive late to the storefront, the DCDP will reprioritize the content being processed by the system ensuring content with spare lead time has its processing deferred while content that is in danger of not making it to the storefront by its premiere date is expedited through the system.

Figure 7:
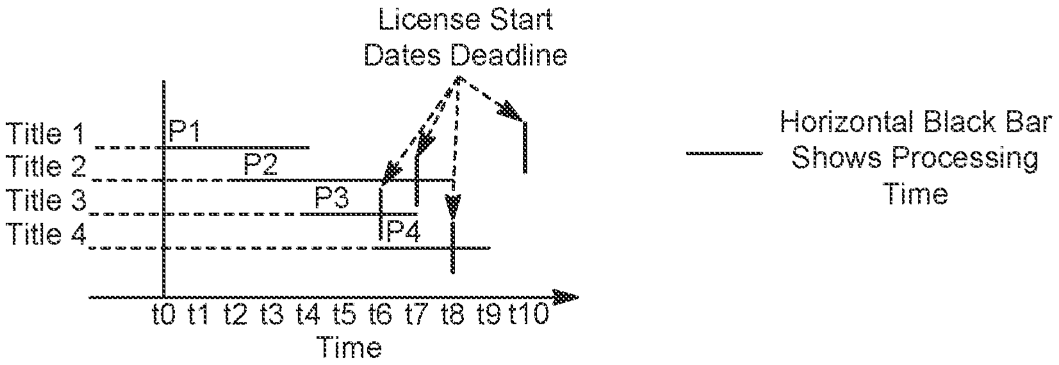
FIG. 7 shows the results of different prioritization schemes for processing video content to be delivered to a video distribution system, including a dynamic content delivery prioritization method.
Figure 7:
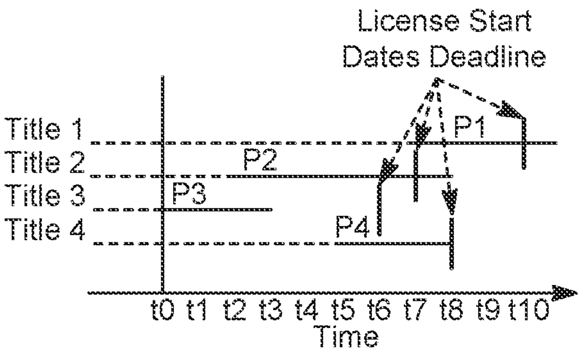
Figure 7:
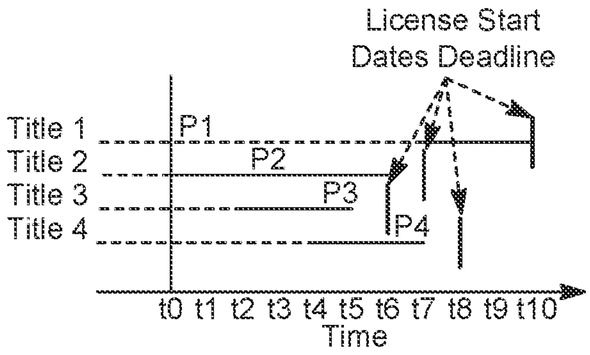

The benefits of this system can be seen in reference to FIG. 7, which shows the effects of different prioritization techniques on whether content titles meet their availability window start times. Specifically, FIG. 7 shows three alternative prioritization schemes: a first in which content is prioritized for processing based on its arrival time (panel (a)), a second in which content is prioritized by its availability window start time (panel (b)), and a third in which the content is dynamically processed according to the methods disclosed herein (panel (c)). In the example shown in FIG. 7, multiple content titles are processed from time $t_0$ to time $t_{10}$ where four specific titles are depicted, along with their respective availability window start times (the vertical bars), the time taken to process the respective titles (the length of the horizontal bars), and the start/finish times for processing each title (the endpoints of the horizontal bars). The content titles shown were received at the VCMS in numerical order i.e., Title 1 to Title 4 sequentially, but have availability window start times in the order Title 3, Title 2, Title 4, and Title 1.

It should be understood that in each of these panels, other content besides the four titles being depicted is being processed based on an earlier priority. Thus, as can be seen by inspecting these panels, from time $t_0$ to $t_2$, resources are available to process only one of the four shown titles, from time $t_2$ to $t_6$ two such titles may be processed, and only after time $t_6$ are there sufficient resources to process three of the four titles depicted.

In panel (a), the four titles are processed according to their arrival time at the VCMS. As can be seen in this figure, only Title 1 meets its availability window start time. In effect, because Title 1 was received so far in advance of its availability start time window, processing this title first used processing resources that were needed for the other three titles to meet their windows.

It might be assumed that this adverse result could be avoided by prioritizing the titles according to their availability widow start times i.e., by processing the title in order of the proximity to their respective availability windows. But panel (b) shows that this is not the case; even in this alternate prioritization scheme Title 2 misses its deadline while both Title 3 and Title 4 were completed well in advance of their respective deadlines.

The dynamic delivery prioritization method shown in panel (c), however, is able to process the titles in an optimal order by which all four titles meet their respective deadlines because it prioritizes titles based not only on the proximity to the availability window start time, but also on the amount of time needed to process the title given current system conditions. This, of course, assumes a means of estimating the time needed to process a title. Thus, the disclosed dynamic delivery prioritization method leverages the PCPE disclosed earlier, which is able to reliably estimate the processing time needed to deliver the content title from the VCMS.

In some preferred embodiments, as detailed below, other factors besides the estimated remaining processing time and the proximity to an availability window may be used to assign relative priorities to content. These other factors may be useful in several circumstances. For example, the DCDP may not be able to provide all titles to the storefront on time, hence other factors may be used to determine which titles will miss their deadlines. In another example, some titles may be of sufficient importance that the risk of its missing its deadline needs to be minimized or reduced. In still other embodiments, these other priorities may be used to temporarily spin up resources, if that is possible, to meet availability windows.

Figure 8:
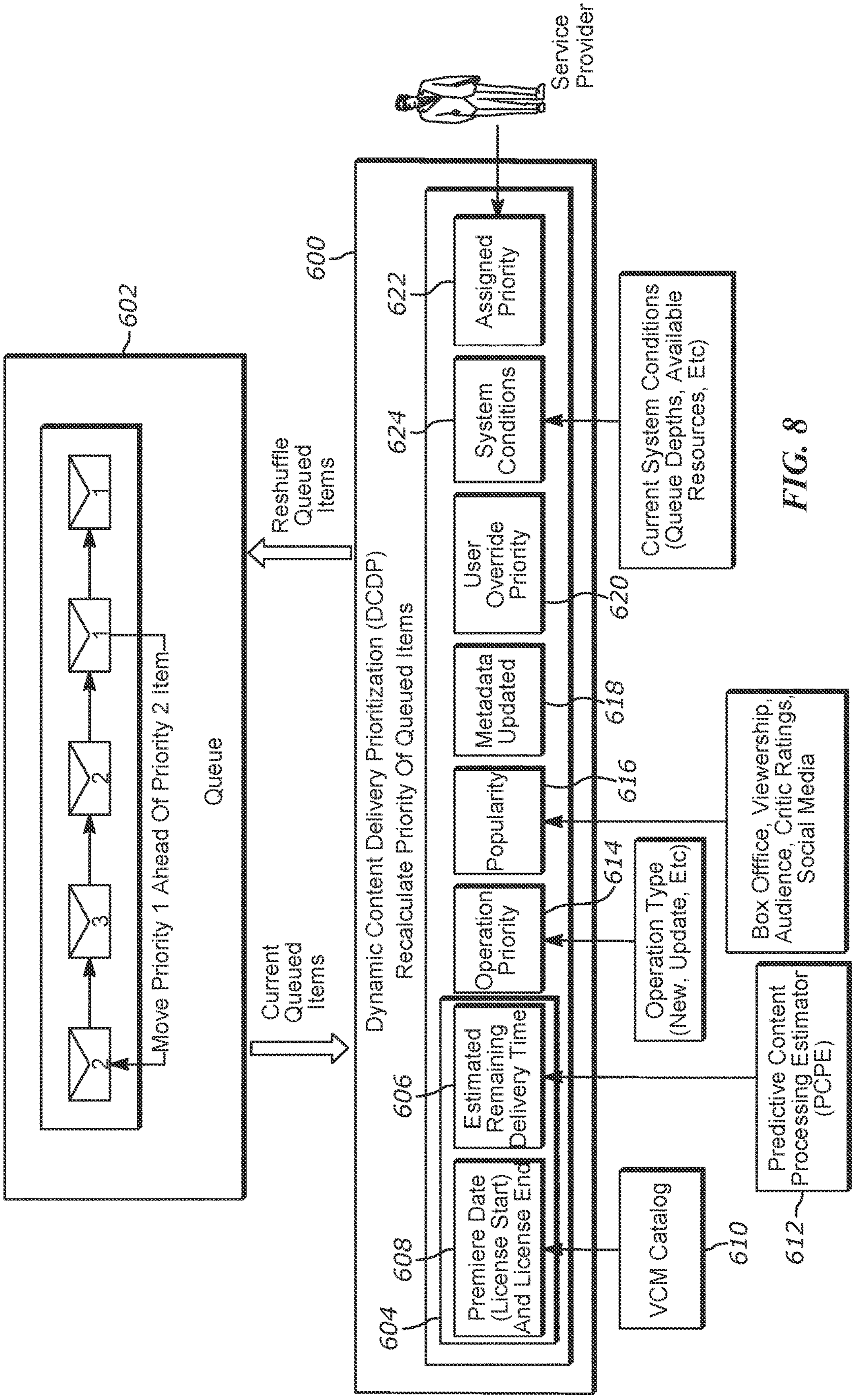
FIG. 8 shows an exemplary system to implement the dynamic content delivery prioritization of FIG. 7.

FIG. 8 shows an exemplary Dynamic Content Delivery Prioritization (DCDP) system used to reprioritize or reshuffle content items in a queue 602, which may be for example a queue in front of any of the processing stages 500-522 shown in FIG. 5. The DCDP 600 receives currently queues titles from the queue 602 along with a current prioritization and reprioritizes or reshuffles them using any one or more of a variety of configurable parameters. For example, as already indicated, the DCDP 600 may receive an availability window information including start and end times from a published catalog 610 along with an estimated remaining delivery time 606 from a PCPE 612, that together may be used to reassign priorities among the queued titles. As also previously stated, in some embodiments, other parameters may be used as well and in such embodiments the multiple parameters may contribute to a priority score based on configurable weights assigned to each parameter. As one example, some embodiments may use an operation priority parameter 615 that indicates a type of operation being performed on a title e.g., processing a new title, updating a title, updating metadata, etc. This information may be useful to prioritize new titles over updates, for example, on the assumption that missing a window for an updated title is not as serious of an event as viewers may still watch the existing, non-updated title. Other parameters that may be used in the prioritization include the popularity of a title 616 and whether metadata is being updated 618 e.g., if an availability window is being modified. Additionally, in some embodiments, different weightings may be given to different metadata fields. Still other parameters may include a user override priority 620 and/or an assigned priority 622. In the former instance, a priority level of "0" may be reserved for a user override priority that allows user input to move a particular title to the front of a queue, while in the latter instance specific titles may be assigned particular priorities or priority scores based on input from a service provider. Still other embodiments may use different parameters 624. For example, some implementations may use any one or a combination of system conditions such as spare or redundant processing slots that are available, or information on transcoders being offline, in which case titles that do not need transcoding may be prioritized. Those of ordinary skill in the art will appreciate that any of these factors may also be used by the PCPE to determine an estimated remaining processing time for individual titles. Furthermore, those of ordinary skill in the art will appreciate that in some embodiments the availability window end time, retrieved from catalog 610 may be used as an independent parameter e.g., if a title missed its start time and the end time is near, the priority for that title may be lowered. In some embodiments, when multiple parameters are used to determine a priority score, operators may configure the formula that produces the priority score by e.g., configuring linear or nonlinear weights assigned to parameters, etc.

In some embodiments, safety margins may be included in the system 600 by, for example, maintaining spare capacity or processing resources that may be activated when needed. Alternately, or additionally, a buffer amount may be included in front of the availability window start time.

Figure 9:
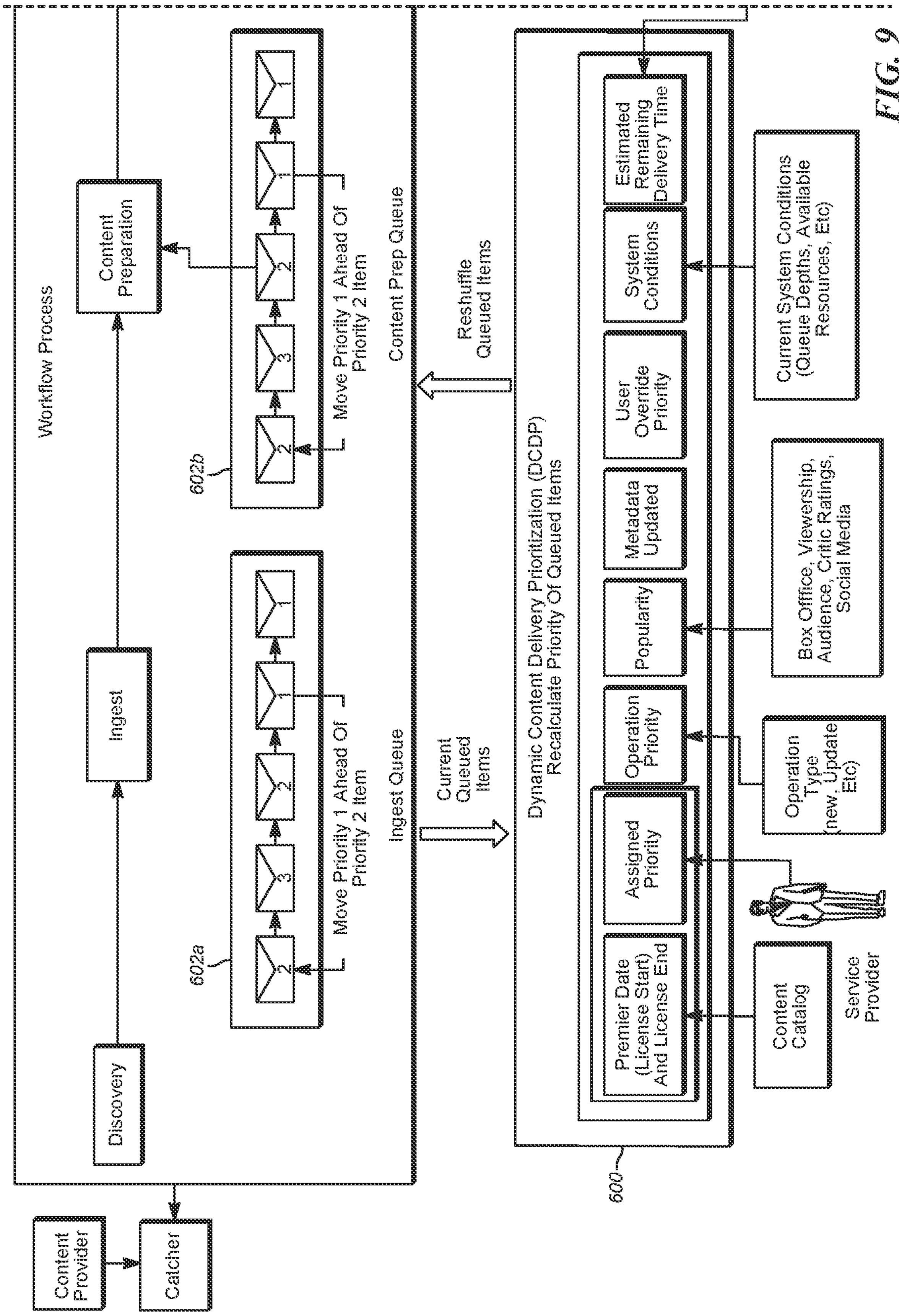
FIG. 9 shows an exemplary workflow for reshuffling content in the queues into various video content processing steps from ingest to delivery.
Figure 9:
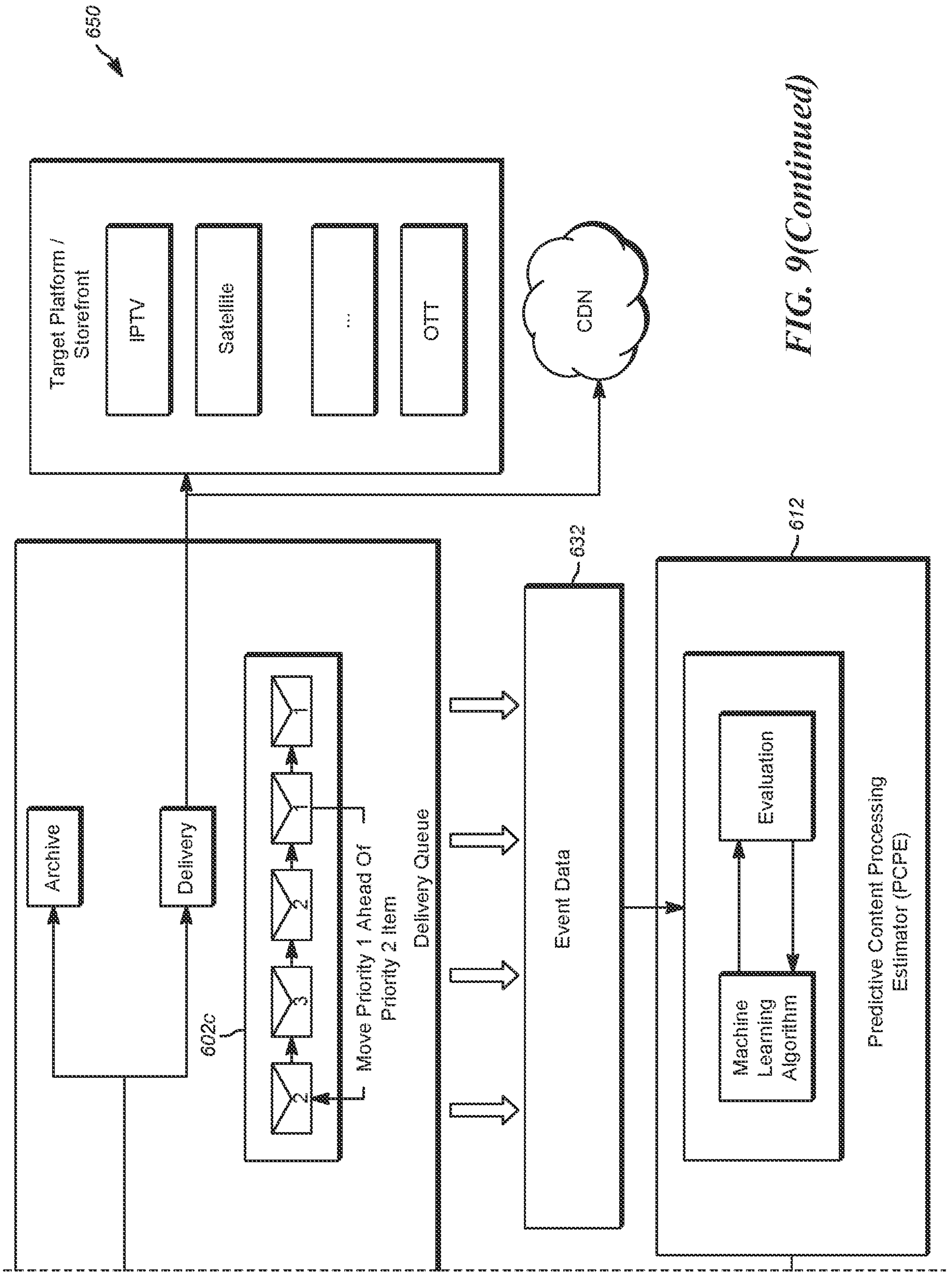

FIG. 9 shows the disclosed DCDP 600 in the context of the workflow of FIG. 5. Where for example, received titles are received by a catcher, discovered, ingested, prepared, etc. prior to ultimate delivery to a storefront and/or a CDN. This workflow will typically involve multiple queues 602*a*, 602*b*, 602*c*, etc. in front of the individual stages, such as before the ingest stage and so forth. The DHCP 600 may preferably be used to reprioritize content in any one of these queues as needed. Therefore, in preferred embodiments, the PCPE 612 provides the DCDP 600 an estimated remaining time to process a title from the position (queue) it is in, to the time of delivery to the storefront/CDN. As can also be seen in FIG. 9, event data 632 may be collected from the workflow and used by the PCPE 612 to calculate this estimated remaining time.

By identifying content in danger of not making it to the storefront in time for its availability window and automatically expediting that content, the service provider can better realize potential revenue and improve customer satisfaction. The automatic nature means operational resources are not expended and the chance that a human operator misses a critical alert is eliminated. Moreover, in preferred embodiments, the prioritization methods disclosed herein are fully automated so as to expedite content without requiring manual intervention by an operations team.

Each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A video processing system comprising a processor operatively connected to a first queue storing a plurality of content titles to be delivered to a Video-on-Demand (VOD) server accessible to customers over a content delivery network, each content title having an associated availability window start time at the VOD server, the system receiving packages, each of said packages comprising a video file and a respective content title;

the system processing said video files so as to be suitable for delivery to said customers by at least one of a discovery process, an ingest process, a quality check process, a transcoding process, a packaging process, and an encryption process;

the system processing said video files according to said first queue; and the system delivering said processed video files to said VOD server;

wherein the processor is configured to selectively reorder the plurality of content titles in the first queue using, for each of the plurality of content titles, a comparison between the associated availability window start time of each content title and a calculated estimate of a remaining time to deliver the respective video file of said each content file to the VOD server.

2. The processing system of claim 1 operatively connected to a second queue in which each of the plurality of content titles will be stored after leaving the first queue, the processing system configured to selectively reorder content titles in the second queue, the system processing said video files in a first process using said first queue and processing said video files in a second process using said second queue.

3. The processing system of claim 1 where the processing of said video files is performed by a Video Content Management System (VCMS) and the calculated estimate of the remaining time is determined using information from the VCMS.

4. The processing system of claim 1 configured to selectively reorder the plurality of content titles in the first queue using a score calculated from: (i) a value representing the comparison; and (ii) at least one additional parameter.

5. The processing system of claim 4 where the value and the at least one additional parameter have respectively different associated weightings.

6. The processing system of claim 5 where the weightings are configurable.

7. The processing system of claim 1 configured to reorder the plurality of content in the first queue in a manner that increases the number of content titles in the first queue being delivered to the VOD server prior to their respectively associated availability window start times absent reordering.

8. A method implemented by a processing system operatively connected to a first queue storing a plurality of content titles to be processed and delivered to a Video-on-Demand (VOD) server accessible to customers over a content delivery network, each content title having an associated availability window start time at the VOD server, the method comprising:

receiving packages, each of said packages comprising a video file and a respective content title;

processing said video files so as to be suitable for delivery to said customers by at least one of a discovery process, an ingest process, a quality check process, a transcoding process, a packaging process, and an encryption process;

processing said video files according to said first queue;

delivering said processed video files to said VOD server; and determining an initial order of the plurality of content titles in the first queue; and selectively reordering the plurality of content titles in the first queue using, for each of the plurality of content titles, a comparison between its associated availability window start time and a calculated estimate of a remaining time to deliver it to the VOD server.

9. The method of claim 8 including selectively reordering content titles in a second queue, each of the plurality of content titles being stored in the second queue after leaving the first queue, the system processing said video files in a first process using said first queue and processing said video files in a second process using said second queue.

10. The method of claim 8 where the first queue is in a Video Content Management System (VCMS).

11. The method of claim 10 where the calculated estimate of the remaining time is determined using information from the VCMS.

12. The method of claim 8 including selectively reordering the plurality of content titles in the first queue using a score calculated from: (i) a value representing the comparison; and (ii) at least one additional parameter.

13. The method of claim 12 where the value and the at least one additional parameter have respectively different associated weightings.

14. The method of claim 8 where the plurality of content in the first queue is reordered in a manner that increases the number of content titles in the first queue being delivered to the VOD server prior to their respectively associated availability window start times absent re-ordering.

15. A system comprising:

a Video Content Management System (VCMS) comprising at least one queue storing a plurality of content titles to be processed and delivered to a Video-on-Demand (VOD) server accessible to customers over a content delivery network;

wherein the VCMS receives packages, each of said packages comprising a video file and a respective content title;

the VCMS processing said video files so as to be suitable for delivery to said customers by at least one of a discovery process, an ingest process, a quality check process, a transcoding process, a packaging process, and an encryption process;

the VCMS processing said video files according to said first queue; and the VCMS delivering said processed video files to said VOD server;

a Predictive Content Processing Estimator (PCPE) that individually calculates an estimate of a remaining time to deliver each content title to the VOD server; and a processor that reorders the plurality of content titles in the queue using calculated said estimates from the PCPE.

16. The system of claim 15 where each content title having an associated availability window start time at the VOD server, and the processor reorders the plurality of content titles in the queue using each associated window start time.

17. The system of claim 15 where the plurality of content in the queue is reordered in a manner that increases the number of content titles in the queue being delivered to the VOD server prior to their respectively associated availability window start times absent reordering.

18. The system of claim 15 where the VCMS includes a plurality of queues into which each content title is sequentially stored, and the processor is configured to reorder the content titles in each of the plurality of queues.

19. The system of claim 15 where the PCPE uses information from the VCMS to individually calculate an estimate of a remaining time to deliver each content title to the VOD server.

* * * * *